(12) United States Patent
Ginja et al.

(10) Patent No.: US 10,017,141 B2
(45) Date of Patent: Jul. 10, 2018

(54) INCREASE OF THE COMPRESSIBILITY OF A BUMPER BEAM

(71) Applicant: Compagnie Plastic Omnium, Lyons (FR)

(72) Inventors: Stephane Ginja, Amberieu en Bugey (FR); Frederic Pierrot, Amberieu en Bugey (FR); Aurelien Seguela, Ruy (FR)

(73) Assignee: Compagnie Plastic Omnium, Lyons (FR)

( * ) Notice: Subject to any disclaimer, the term of this patent is extended or adjusted under 35 U.S.C. 154(b) by 0 days.

(21) Appl. No.: 15/107,938

(22) PCT Filed: Dec. 23, 2014

(86) PCT No.: PCT/FR2014/053543
§ 371 (c)(1),
(2) Date: Jun. 24, 2016

(87) PCT Pub. No.: WO2015/097410
PCT Pub. Date: Jul. 2, 2015

(65) Prior Publication Data
US 2016/0332587 A1    Nov. 17, 2016

(30) Foreign Application Priority Data
Dec. 26, 2013   (FR) ...................... 13 63603

(51) Int. Cl.
*B60R 19/18*    (2006.01)
*B60R 19/34*    (2006.01)

(52) U.S. Cl.
CPC .............. *B60R 19/18* (2013.01); *B60R 19/34* (2013.01); *B60R 2019/1853* (2013.01)

(58) Field of Classification Search
CPC ......... B60R 19/02; B60R 19/03; B60R 19/18; B60R 19/26; B60R 19/34
(Continued)

(56) References Cited

U.S. PATENT DOCUMENTS 4,413,856 A * 11/1983 McMahan ............... B60R 19/26
293/110
6,179,355 B1    1/2001 Chou et al.
(Continued)

FOREIGN PATENT DOCUMENTS

| EP | 1426242 A2 | 6/2004 |
| GB | 2344794 A  | 6/2000 |
| GB | 2422136 A  | 7/2006 |

OTHER PUBLICATIONS

International Search Report PCT/ISA/210 for International Application No. PCT/FR2014/053543 dated Mar. 27, 2015.
(Continued)

Primary Examiner — Jason S Daniels
(74) Attorney, Agent, or Firm — Harness, Dickey & Pierce, P.L.C.

(57) ABSTRACT

The bumper beam of a motor vehicle comprising a chassis and comprising at least one horizontal flank and at least one vertical flank extending longitudinally to the beam comprises at least one bearing member arranged so as to be supported on the chassis and to exert a reaction force in one direction on said at least one horizontal flank during the absorption of an impact by said beam, said bearing member being stronger than said at least one horizontal flank in the direction of the reaction force.

11 Claims, 3 Drawing Sheets

(58) Field of Classification Search
USPC .................................. 293/102, 120, 132, 133
See application file for complete search history.

(56) References Cited

U.S. PATENT DOCUMENTS

| | | | | |
|---|---|---|---|---|
| 6,971,690 | B2* | 12/2005 | Evans ..................... | B60R 19/18 |
| | | | | 293/102 |
| 8,905,444 | B2* | 12/2014 | Zannier ................... | B60R 19/34 |
| | | | | 293/132 |
| 2004/0282931 | | 12/2004 | Roussel et al. | |
| 2015/0129116 | A1* | 5/2015 | Richeton ................. | B60R 19/03 |
| | | | | 156/180 |

OTHER PUBLICATIONS

Written Opinion of the International Searching Authority PCT/ISA/237 for International Application No. PCT/FR2014/053543 dated Mar. 27, 2015.

French Search Report and Written Opinion for French Application No. FR 1363603 dated Sep. 18, 2014.

\* cited by examiner

INCREASE OF THE COMPRESSIBILITY OF A BUMPER BEAM

CROSS-REFERENCE TO RELATED APPLICATIONS

This application is the U.S. National Phase application of PCT Application No. PCT/FR2014/053543 filed on Dec. 23, 2014, which claims priority to French Patent Application No. 1363603 filed on Dec. 26, 2013, the contents of each of which are incorporated herein by reference.

The invention relates to the technical field of bumper beams for motor vehicles.

In a motor vehicle bumper, the purpose of the beam is to distribute the force applied by an obstacle during an impact, in particular during a Danner impact (insurance rating impact carried out at a speed of 15 km/h), over the entire front surface of the vehicle to avoid any stress concentration on the bumper and penetration of the obstacle in the bumper up to the passenger compartment.

It is also known that a bumper comprises a low-speed impact absorption system to protect the chassis and restrict to the bumper the area of the vehicle damaged by an impact. The absorption systems comprise one or more absorbers. In particular, at the front of the beam, there is an absorber for pedestrian impact (leg impact carried out at a speed of 40 km/h) and, behind the beam, absorbers for the Danner impact.

If there are two absorbers and they are located behind the beam, they are attached to the side members and connected together by the beam. Since the role of these absorbers is to dissipate as much as possible the mechanical energy resulting from a collision of the vehicle with an obstacle, so that the mechanical energy transmitted to the driver and any passengers is as low as possible and to minimize the chassis deformation, it is preferable that both of them should dissipate the energy in the event of an impact with a front impact offset to one side. Since the beam is located in front of the absorbers, it first receives the mechanical energy resulting from the impact, then transmits it to the two absorbers.

In order to optimize the impact absorption, it is necessary to maximize the absorption stroke in the vehicle longitudinal direction, i.e. the distance between the front side of the bumper and the rear side of the absorbers, over which the energy can be dissipated.

However, these parts are subjected to geometrical constraints, since the front area of the vehicle comprises numerous components which must all be present, and therefore, they must be as small as possible, which means that the absorption stoke provided to the bumper cannot be as large as desired.

The invention aims to increase the compressibility of the beam during an impact to increase the absorption stroke of the bumper.

The invention therefore relates to a bumper beam of a motor vehicle comprising a chassis, said beam comprising at least one horizontal flank and at least one vertical flank extending longitudinally to the beam, and at least one bearing member arranged so as to be supported on the chassis and to exert a reaction force in one direction on said at least one horizontal flank during the absorption of an impact by said beam, said bearing member being stronger than said at least one horizontal flank in the direction of the reaction force.

Thus, some of the horizontal flanks of the beam are compressed in the vehicle longitudinal direction until they break, which considerably increases the absorption stroke of the bumper.

According to one embodiment, the beam has a W-shaped profile such that it comprises four horizontal flanks and three vertical flanks.

According to another embodiment, the beam comprises unidirectional fibers.

By providing the horizontal flanks with such fibers, they break more easily during absorption of an impact since the fibers are subjected to forces whose direction is perpendicular to their axis.

According to another embodiment, the beam comprises bidirectional or multiaxial reinforcements in at least some of its vertical flanks, the bidirectional or multiaxial reinforcements being selected from a list comprising: ribbon, fabric, non-woven, mat.

In combination with unidirectional fibers, such reinforcements can improve the mechanical properties of the vertical flanks of the beam in at least one of the directions which is not that of the unidirectional fibers and ensure that they do not break during absorption of an impact. The fibers are sandwiched between two layers of bidirectional or multiaxial reinforcement. The unidirectional fibers and the bidirectional or multiaxial reinforcements may consist of the following materials: glass, carbon, aramid.

Advantageously, the bearing member comprises a portion of an absorber arranged to be supported on the chassis.

Depending on the vehicle configuration, the absorber is supported on a side member to which it is attached, the side member being fastened to the chassis, or the absorber is fastened to the chassis directly.

Preferably, the portion of the absorber is one side of this absorber.

Preferably, the bearing member comprises a blade fastened firstly to the beam and secondly to the portion of the absorber.

The blade is therefore supported indirectly on the chassis through the absorber.

Furthermore, the blade helps to absorb the mechanical energy of the impact.

Advantageously, the blade has generally the shape of a square.

Preferably, the bearing member comprises a vertical flank of the beam, preferably a vertical flank comprising bidirectional reinforcements.

Thus, the bearing member comprising the portion of the absorber, the blade and one of the vertical flanks (rigid in the vehicle axis) of the beam is supported on the chassis and can effectively compress the two horizontal flanks adjacent the vertical flank of the member. The vertical flank of the bearing member should preferably be located behind the beam (i.e. on the side where the vehicle is located) so that the blade can effectively break the two adjacent horizontal flanks.

Advantageously, the bearing member comprises several blades.

This ensures that the bearing member is much stronger than the horizontal flanks which are adjacent thereto in the direction of the reaction force, and that the reaction force is applied better on these flanks.

The invention will be better understood on reading the accompanying figures, which are given solely by way of example and not limiting in any way, in which.

In the following description, we use a motor vehicle coordinate system R(O, x, y, z), wherein O is the central point of the volume defined by the vehicle, axis (Ox) corresponds to the main vehicle axis and to the X direction, axis (Oy) corresponds to the horizontal direction perpendicular to the main vehicle axis and to the Y direction, and axis (Oz) is the vertical of the location and corresponds to the Z direction.

Figure 1:
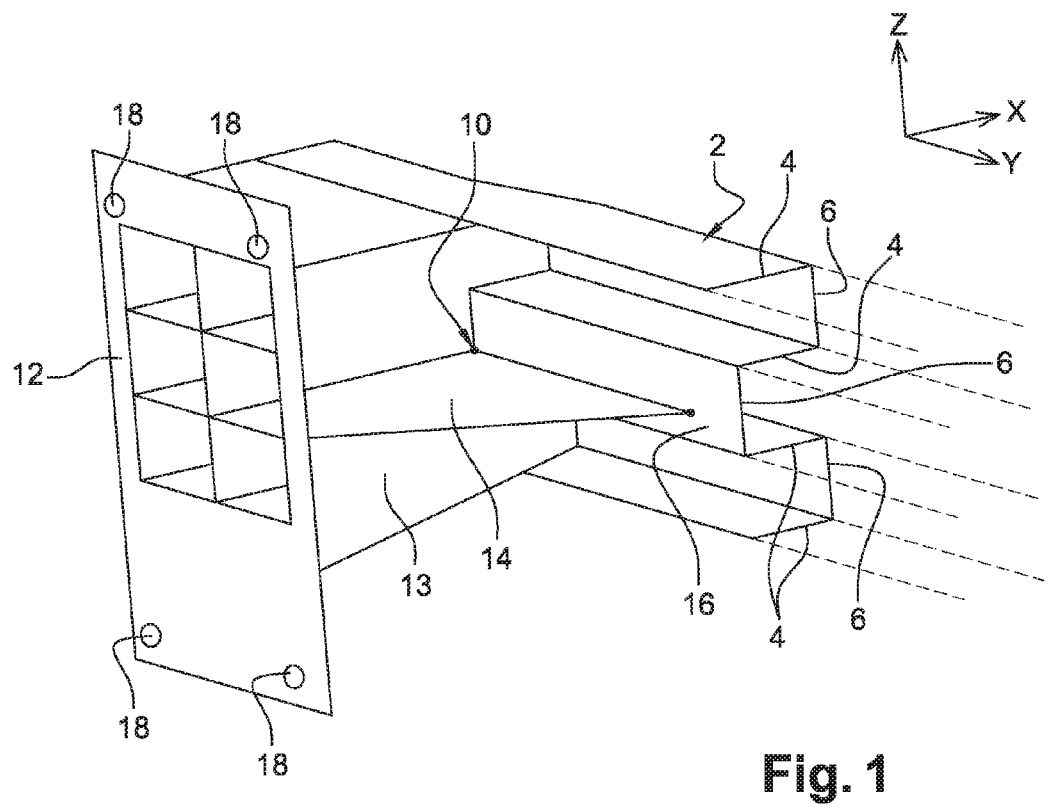
FIGS. 1 and 2 are perspective views of one end of a beam and its bearing member according to the invention, respectively before and after absorption of an impact.
Figure 2:
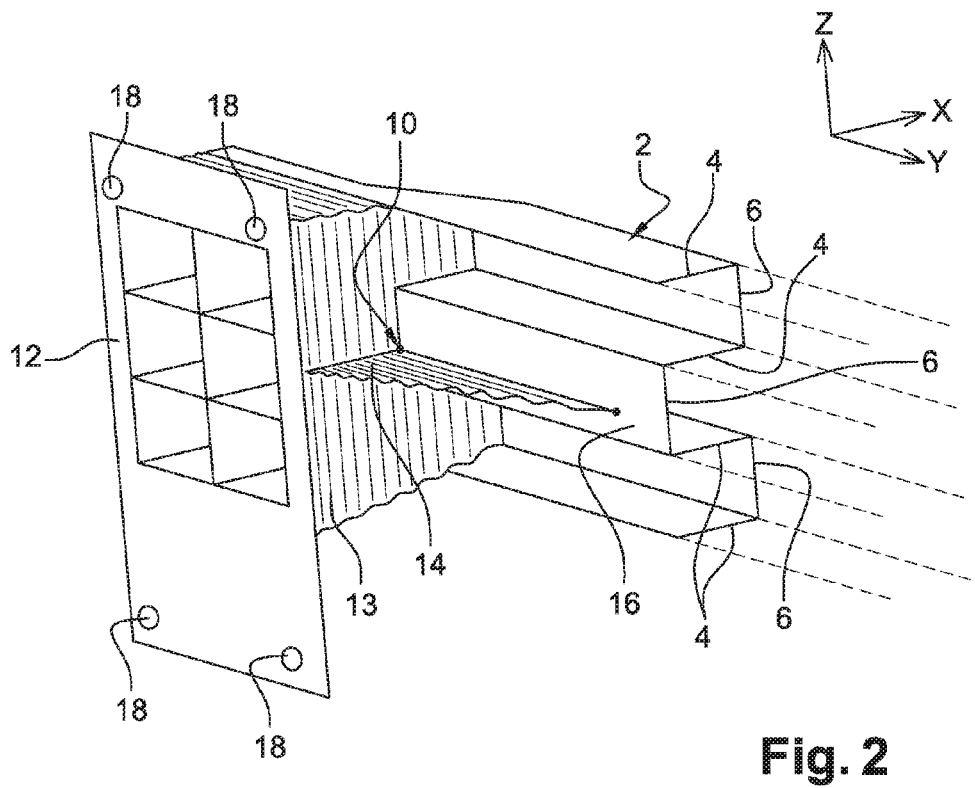

For clarity, FIGS. 1 and 2 only show the left side of the bumper. However, the two sides of the bumper are composed of exactly the same parts and behave in the same way. The following description will therefore only consider the left side of the bumper, knowing that the right side can be deduced by symmetry with respect to the plane (Oxz).

Figure 3:
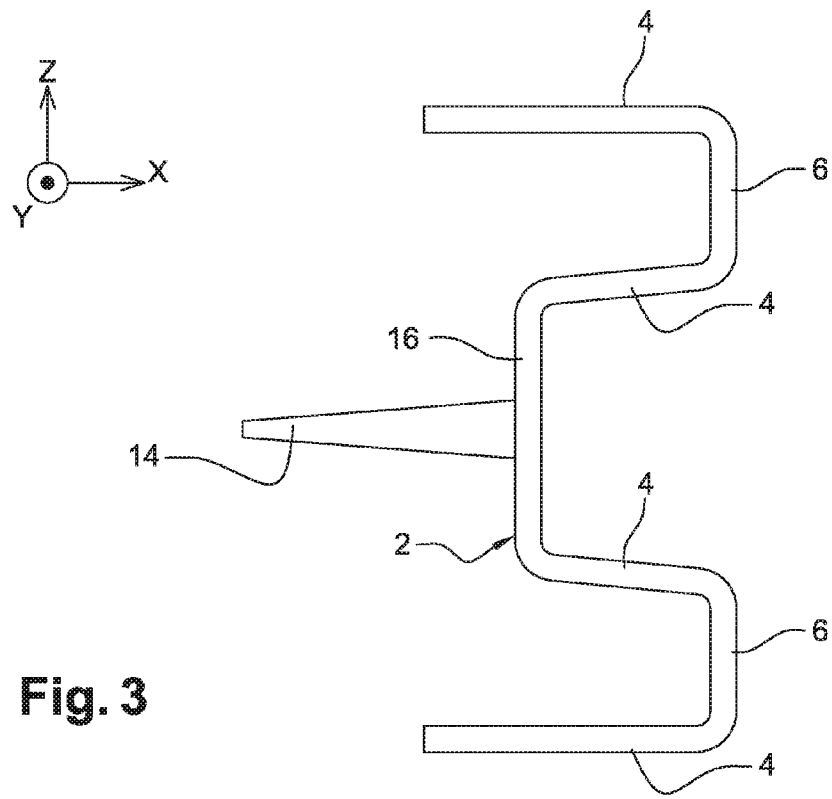
FIGS. 3 and 4 are cross-sectional views of the beam respectively of FIGS. 1 and 2.

Referring to FIGS. 1 and 3, a bumper of the vehicle is provided with a beam 2 extending in the Y direction. This beam comprises four horizontal flanks 4 and three vertical flanks 6, each of these flanks comprising unidirectional fibers, for example carbon and glass fibers, which are highly resistant in the direction of their axis which coincides with the Y direction but considerably less resistant in any direction perpendicular to their axis. The vertical flanks further comprise bidirectional reinforcements, such as tape, fabric, mat or non-woven (stitched reinforcements), sandwiching the fibers in these flanks so as to make the latter resistant to any force along the direction of the main vehicle axis.

As an example of embodiment, this type of beam can be produced using a pultrusion process. The horizontal flanks may have in their thickness carbon fibers representing a thickness of 2 mm, i.e. $2.10 \text{ m}^{-3}$, taken between two layers of glass fibers of thickness 1 mm, i.e. $1.10^{-3}$ m. The vertical flanks may have in their thickness carbon fibers representing a thickness of 1.4 mm, i.e. $1.4.10 \text{ m}^{-3}$, sandwiched between two layers of glass fibers representing a thickness of 0.4 mm, i.e. $4.10^{-4}$ m, these three fibre layers being sandwiched between two tape layers each having a thickness of 0.4 mm, i.e. $4.10^{-4}$ m.

The bumper is also provided with an absorber 12 attached to a side member (not shown) of the vehicle by attachment means 18, the side member itself being attached to the vehicle chassis, not shown here. The absorber is designed to absorb as much of the mechanical energy generated by an impact as possible, in order to deform the chassis as little as possible. The absorber is overmoulded on one end of the beam 2. Furthermore, a blade 14 having generally the shape of a square is fastened directly firstly to one side 13 of the absorber and secondly to a specific flank 16 amongst the vertical flanks of the beam. The blade 14 extends substantially in a plane perpendicular to the Z direction and has a small thickness, for example less than 1 cm. This type of configuration firstly allows the beam to be supported indirectly on the chassis, and secondly allows the blade to help absorb an impact. The side 13, the blade 14 and the flank 16 form a bearing member 10.

Figure 4:
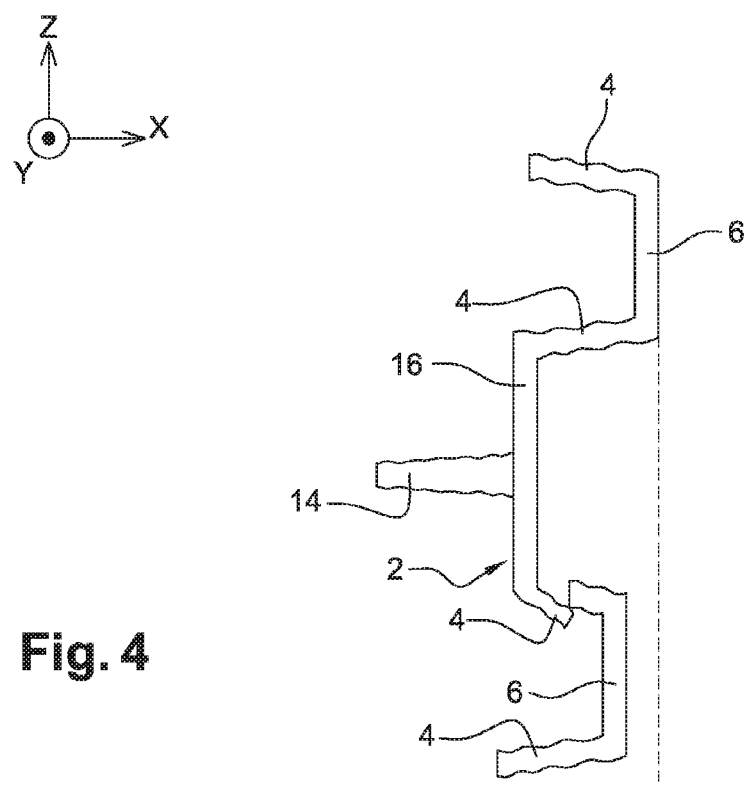

It is considered that the bumper is subjected to a shock with partial front impact (i.e. offset to one side) on its left side. FIGS. 2 and 4 illustrate the condition of the beam 2 and of the bearing member 10 respectively before and after complete absorption of the impact by the vehicle. The obstacle with which the vehicle collides thereby generates a force applied to the bumper in the X direction, directed towards the rear of the vehicle. This force propagates in particular up to the bearing member 10, which firstly will partly absorb the energy through the absorber, and secondly will generate a reaction force applied in particular on the surface composed of the flank 16 in the X direction towards the front of the vehicle. Since this flank is thin in the direction of the reaction force and comprises bidirectional reinforcements, it will only dissipate a very small part of the impact energy, and the reaction force will apply in particular on the two adjacent horizontal flanks 4, which then compress until they break, thereby considerably increasing the bumper absorption stroke. The orientation of the blade 14 localises the force applied by the blade 14 on the flank 16 to favor breakage of the two adjacent horizontal flanks 4. FIG. 4 shows in particular that the lower horizontal flank 4, adjacent to the vertical flank 16 of the bearing member, broke after absorbing the impact, which reduced the incompressibility of the beam as illustrated by the vertical broken line. These two horizontal flanks 4 are also adjacent to the vertical flanks 6 which form the front of the beam 2. In other words, the horizontal flanks 4 of the beam 2 on which the bearing member 10 exerts its thrust is adjacent the front of the beam. The compressibility of the beam 2 is therefore increased near the front of the beam, i.e. near the area of the bumper in which the impact is applied.

Figure 5:
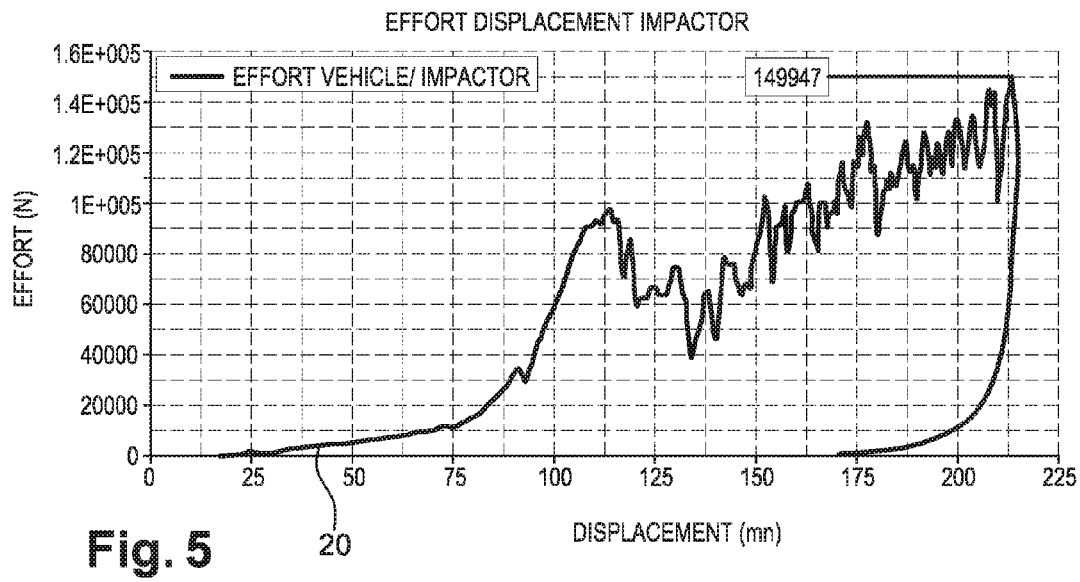
FIG. 5 is a graph against time of the force applied on a beam for which no horizontal flank breaks.
Figure 6:
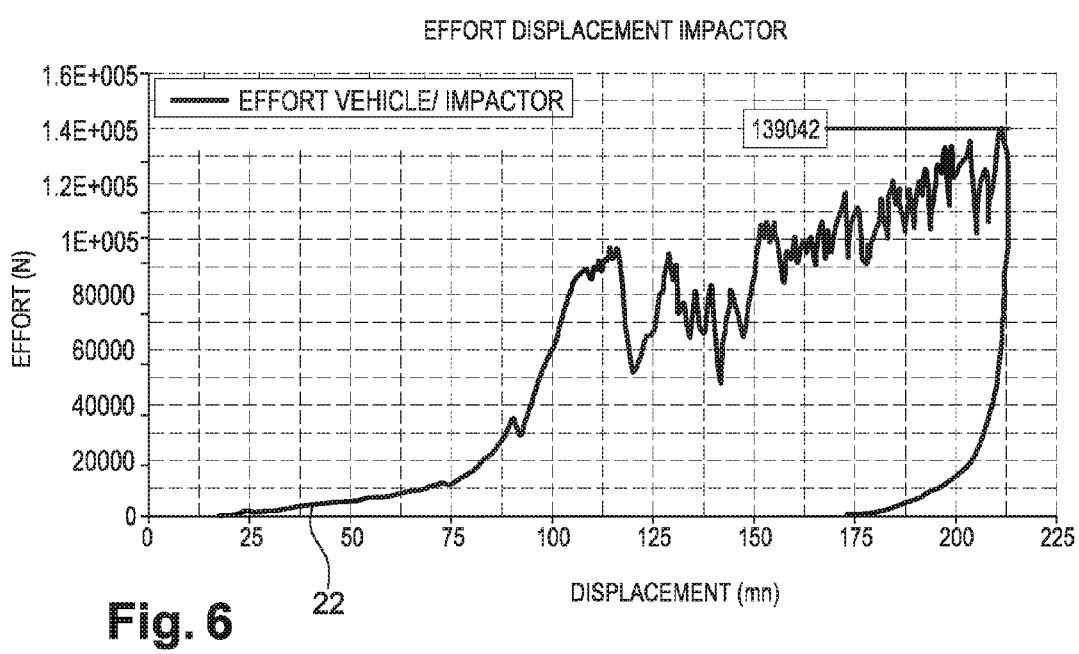
FIG. 6 is a graph similar to that of FIG. 5 for a beam for which some of the horizontal flanks break.

FIGS. 5 and 6 show the change in the force applied during an impact between an obstacle and the beam according to the displacement, in the vehicle coordinate system, of a point of contact between the obstacle and the bumper, respectively if none of the horizontal flanks break (curve 20) and if the two horizontal flanks adjacent to the vertical flank forming part of the bearing member break (curve 22). The two impacts are simulated under the same experimental conditions. Thus, the areas under these two curves, which represent the total mechanical energy dissipated, are equal.

A key feature of the bumper is the maximum force to which it is subjected during absorption of the impact. We see that the value of this maximum force is reached firstly at a displacement of about 215 mm, i.e. $2.15.10^{-1}$ m, and secondly that it is different depending on whether or not the beam breaks. Curve 20 shows that it is about $1.5.10^5$ N if the horizontal flanks do not break, and curve 22 that is about $1.4.10^5$ N if the bearing member breaks the two horizontal flanks adjacent thereto. This represents a difference of $1.10^4$ N between the two cases, which is not negligible. If the beam breaks locally, less force is transmitted to the chassis, which is therefore deformed much less, and to the passenger compartment housing the driver and any passengers.

Obviously, numerous modifications can be made without leaving the scope of the invention.

The beam profile may be different from that described above.

The various flanks may include materials other than those described above. In particular, the horizontal flanks may comprise bidirectional reinforcements, but fewer than the vertical flanks so that the latter remain stronger than the horizontal flanks in the direction of the force applied during an impact.

The thicknesses and distribution of the thicknesses in the flanks may be different from those described above.

The blade can be replaced by a plurality of blades and these blades may be supported directly on the horizontal flanks to be broken.

The absorber may be fastened to the chassis.

The invention claimed is:

1. A bumper beam of a motor vehicle, the bumper beam comprising:
   a chassis,
   at least one horizontal flank and at least one vertical flank extending longitudinally to the beam,
   at least one bearing member configured to be supported on the chassis and to exert a reaction force in one direction on said at least one horizontal flank during absorption of an impact by said beam, the at least one bearing member including a blade,
   said at least one bearing member being stronger than said at least one horizontal flank in the direction of the reaction force, and
   the at least one horizontal flank being configured to be broken by the blade upon the impact.

2. The bumper beam according to claim 1, wherein the beam has a W-shaped profile and includes four horizontal flanks and three vertical flanks.

3. The bumper beam according to claim 1, wherein the beam comprises unidirectional fibres.

4. The bumper beam according to claim 1, further comprising bidirectional or multiaxial reinforcements in at least some of its vertical flanks, the bidirectional or multiaxial reinforcements being selected from ribbon, fabric, nonwoven, and mat.

5. The bumper beam according to claim 1, wherein the at least one bearing member comprises a portion of an absorber configured to be supported on the chassis.

6. Beam according to claim 5, wherein the portion of the absorber is one side of the absorber.

7. The bumper beam according to claim 5, wherein the blade is fastened to the beam and to the portion of the absorber.

8. The bumper beam according claim 7, wherein the blade has generally a square shape.

9. Beam according to claim 5, wherein the at least one bearing member comprises a vertical flank of the beam.

10. Beam according to claim 7, wherein the at least one bearing member comprises several blades.

11. The bumper beam of claim 1, wherein:
    the at least one horizontal flank comprises two adjacent horizontal flanks; and
    the two adjacent horizontal flanks are configured to be broken by the blade upon the impact.

* * * * *